(12) United States Patent
Jiang et al.

(10) Patent No.: US 11,212,835 B2
(45) Date of Patent: Dec. 28, 2021

(54) METHOD OF TRANSMITTING INFORMATION IN UNLICENSED BAND, NETWORK DEVICE, AND TERMINAL

(71) Applicant: VIVO MOBILE COMMUNICATION CO., LTD., Guangdong (CN)

(72) Inventors: Lei Jiang, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 24 days.

(21) Appl. No.: 16/635,507

(22) PCT Filed: Aug. 1, 2018

(86) PCT No.: PCT/CN2018/098041
§ 371 (c)(1),
(2) Date: Jan. 30, 2020

(87) PCT Pub. No.: WO2019/024871
PCT Pub. Date: Feb. 7, 2019

(65) Prior Publication Data
US 2020/0163117 A1    May 21, 2020

(30) Foreign Application Priority Data

Aug. 2, 2017 (CN) .......................... 201710651463.8

(51) Int. Cl.
*H04W 74/08*    (2009.01)
*H04W 16/14*    (2009.01)
(Continued)

(52) U.S. Cl.
CPC ....... *H04W 74/0808* (2013.01); *H04W 16/14* (2013.01); *H04W 24/08* (2013.01); *H04W 72/046* (2013.01)

(58) Field of Classification Search
CPC . H04W 74/0808; H04W 16/14; H04W 24/08; H04W 72/046
(Continued)

(56) References Cited

U.S. PATENT DOCUMENTS 9,847,962 B2    12/2017 Liu et al.
10,080,159 B2    9/2018 Valliappan et al.
(Continued)

FOREIGN PATENT DOCUMENTS

| CN | 106465398 A | 2/2017 |
| CN | 106658751 A | 5/2017 |
| CN | 106664723 A | 5/2017 |

OTHER PUBLICATIONS

CN Office Action and Seach Report dated Jan. 8, 2020 as received in Application No. 201710651463.8.
(Continued)

*Primary Examiner* — Danh C Le
(74) *Attorney, Agent, or Firm* — Maschoff Brennan

(57) ABSTRACT

A method of transmitting information in an unlicensed band, a network device and a terminal are provided. The method includes: when information needs to be transmitted with a transmission beam, listening to a channel of the unlicensed band with a reception beam of the node to obtain a channel listening result; and in a case that the channel listening result indicates that the channel is in an idle state, transmitting the information on the channel with the transmission beam.

20 Claims, 2 Drawing Sheets

(51) Int. Cl.
*H04W 24/08* (2009.01)
*H04W 72/04* (2009.01)

(58) Field of Classification Search
USPC .......................... 370/329, 310.2; 455/452.2
See application file for complete search history.

(56) References Cited

U.S. PATENT DOCUMENTS

| | | | |
|---|---|---|---|
| 2008/0117865 A1 | 5/2008 | Li et al. | |
| 2010/0265895 A1 | 10/2010 | Bracha | |
| 2015/0373582 A1 | 12/2015 | Valliappan et al. | |
| 2016/0037560 A1 | 2/2016 | Liu et al. | |
| 2017/0171887 A1* | 6/2017 | Shi | H04W 16/14 |
| 2019/0082333 A1* | 3/2019 | Malik | H04B 7/0695 |
| 2019/0089443 A1* | 3/2019 | Malik | H04B 7/0404 |
| 2019/0166503 A1* | 5/2019 | Ahn | H04W 16/14 |
| 2019/0200389 A1* | 6/2019 | Li | H04W 72/1231 |
| 2019/0230665 A1* | 7/2019 | Lopez-Perez | H04W 16/14 |
| 2019/0306883 A1* | 10/2019 | Shi | H04W 72/046 |
| 2019/0387412 A1* | 12/2019 | Kim | H04L 27/2673 |
| 2020/0045735 A1* | 2/2020 | Kim | H04W 16/28 |
| 2020/0059965 A1* | 2/2020 | Mangalvedhe | H04W 24/10 |
| 2020/0099436 A1* | 3/2020 | Malik | H04B 7/0404 |

OTHER PUBLICATIONS

Nokia et al. "Impact of UE TX/RX Beam Correspondence and Non-correspondence" 3GPP TSG-RAN WG1#87 R1-1612298, pp. 6 (Nov. 18, 2016).
Interdigital, Inc. "On LBT for Beam-Based Transmission for NR-U" 3GPP TSG RAN WGJ Meeting #92bis R1-1804885, pp. 6 (Apr. 20, 2018).
European Search Report in Application No. 18841680.4 dated Jul. 6, 2020.
CN Office Action in Application No. 201710651463.8 dated Jan. 8, 2020.
CN Office Action in Application No. 201710651463.8 dated Jun. 22, 2020.
"Impact of UE TX/RX Beam correspondence and non-correspondence" 3GPP TSG-RAN WG1#87, Nov. 14, 2016.
"PRACH Resource Configuration for Single-Beam and Multi-Beam" 3GPP TSG-RAN WG1#87, Nov. 14, 2016.
"NR 4-step random access procedure" 3GPP TSG RAN WG1 NR Ad Hoc , Jan. 16, 2017.
"Beam Management—Beam Reciprocity Impacts", 3GPP TSG RAN WG1 NR Ad-Hoc Meeting, Jan. 16, 2017.
"Discussion on need of DL and UL RS association", 3GPP TSG RAN WG1 Meeting #89, May 15, 2017.
"On LBT for Beam-Based Transmission for NR-U", 3GPP TSG RAN WG1 Meeting #92bis, Apr. 16, 2018.
Written Opinion and International Search Report in Application No. PCT/CN2018098041 dated Feb. 13, 2020.

* cited by examiner

METHOD OF TRANSMITTING INFORMATION IN UNLICENSED BAND, NETWORK DEVICE, AND TERMINAL

CROSS-REFERENCE TO RELATED APPLICATION

This application is the U.S. national phase of PCT Application No. PCT/CN2018/098041 filed on Aug. 1, 2018, which claims a priority to Chinese Patent Application No. 201710651463.8 filed on Aug. 2, 2017, the disclosures of which are incorporated in their entirety by reference herein.

TECHNICAL FIELD

The present disclosure relates to the field of communication technology, in particular to a method of transmitting information in an unlicensed band, a network device and a terminal.

BACKGROUND

In future 5th Generation (5G) communication system, which is also called as New Radio (NR) system, unlicensed band can serve as a supplement to licensed band, assisting operators in expanding their services. To keep conformity with NR deployment, and to maximize unlicensed access based on NR as much as possible, an unlicensed band may operate at bands of 5 GHz, 37 GHz and 60 GHz. Large bandwidth (80 MHz or 100 MHz) of the unlicensed band can reduce complexity of implementations of network devices and terminals. The unlicensed band is shared by multiple radio access technologies (RATs) such as WiFi, radar, Long Term Evolution License Assisted Access (LTE-LAA), so the usage of the unlicensed band in some countries and regions should comply with some regulations, such as Listen Before Talk (LBT), Maximum channel Occupancy Time (MCOT) and the like, so as to ensure equitable usage of the resource by all devices.

In order to realize a downlink transmission rate of 20 Gbps and an uplink transmission rate of 10 Gbps in the NR system, high-frequency communication and large-scale antenna technology will be introduced. High-frequency communication can provide larger system bandwidth, and size of antenna can be smaller, which can facilitate deployment of large-scale antennas in network device and terminal (User Equipment, UE). High-frequency communication has disadvantages of large path loss, being susceptible to interference and fragile link, while large-scale antenna technology can provide large antenna gain; hence, the combination of high-frequency communication and large-scale antennas is an inexorable trend of future 5G mobile communication system.

In high-frequency communication, a network device, which is also called as a network transmission and reception point (TRP), and a terminal will perform transmissions and receptions using beamforming technology. Beam correspondence of a transmission (Tx) beam and a reception (Rx) beam of a TRP satisfies at least one of following conditions: 1, the TRP may determine an uplink Rx beam of the TRP based on measurement of a UE on one or more downlink Tx beams of the TRP; 2, the TRP may determine a downlink Tx beam of the TRP based on measurement on one or more uplink Rx beams of the TRP. Beam correspondence of a Tx beam and a Rx beam of a UE satisfies at least one of following conditions: 1, the UE may determine an uplink Tx beam of the UE based on measurement on one or more downlink Rx beams of the UE; 2, the UE may determine a downlink Rx beam of the UE according to an indication of measurement of the TRP on one or more uplink Tx beams of the UE.

For unlicensed band, especially for high-frequency band such as 37 GHz and 60 GHz, data transmission needs to rely on beamforming, so conventional listening mechanism cannot accurately determine channel state in channel accessing.

SUMMARY

In a first aspect, a method of transmitting information in an unlicensed band is provided according to embodiments of the present disclosure. The method is applied to a node and includes: listening to a channel of the unlicensed band with a reception beam of the node to obtain a channel listening result, when information needs to be transmitted with a transmission beam; and transmitting the information on the channel with the transmission beam, in a case that the channel listening result indicates that the channel is in an idle state.

In a second aspect, a node is provided according to embodiments of the present disclosure. The node includes: a listening module, configured to listen to a channel of an unlicensed band with a reception beam of the node to obtain a channel listening result, when information needs to be transmitted with a transmission beam; and a transmission module, configured to transmit the information on the channel with the transmission beam, in a case that the channel listening result indicates that the channel is in an idle state.

In a third aspect, a network device is provided according to embodiments of the present disclosure. The network device includes: a processor, a memory and a program stored in the memory and executable by the processor, and when the program is executed by the processor, the steps of the method of transmitting information in the unlicensed band as described above are performed.

In a fourth aspect, a terminal is provided according to embodiments of the present disclosure. The terminal includes: a processor, a memory and a program stored in the memory and executable by the processor, and when the program is executed by the processor, the steps of the method of transmitting information in the unlicensed band as described above are performed.

In a fifth aspect, a computer readable storage medium, having a program stored thereon, is provided according to embodiments of the present disclosure. When the program is executed by a processor, the steps of the method of transmitting information in the unlicensed band as described above are performed.

BRIEF DESCRIPTION OF THE DRAWINGS

To better clarify technical solutions of embodiments of the present disclosure, drawings used in description of the embodiments of the present disclosure are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

Figure 1:
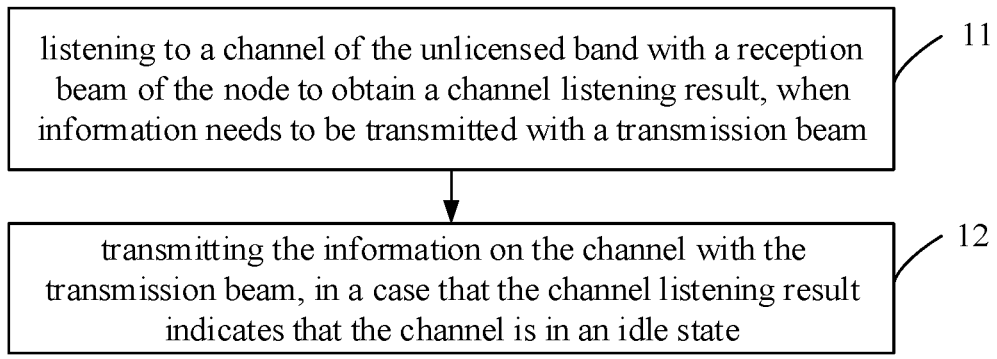
FIG. 1 is a schematic flow chart of a method of transmitting information in an unlicensed band according to embodiments of the present disclosure.

Exemplary embodiments of the present disclosure will be described in more detail with reference to the accompanying drawings hereinafter. While the exemplary embodiments of the present disclosure are shown in the drawings, it should be understood that the present disclosure may be carried out in various forms without being limited by the embodiments set forth herein. Rather, these embodiments are provided so that the present disclosure can be understood more thoroughly and the scope of the present disclosure can be fully conveyed to a person skilled in the art.

Terms such as "first" and "second" in the description and claims of the present disclosure are for distinguishing similar objects, and do not indicate any particular sequence or order. It can be understood, terms described in such way can be interchanged in proper situations, such that the embodiments described in the present disclosure can be implemented in other orders in addition to the order illustrated or described herein. In addition, terms such as "include" and "have" and any variations thereof are intended to cover non-exclusive inclusion. For example, a process, method, system, product, or device including a series of steps or units is not limited to those steps or units that are explicitly listed, but may optionally include other steps or units that are not explicitly listed or that are inherent in the process, method, product, or device.

For an NR system, a channel state is inaccurately determined by using conventional listening mechanism in an unlicensed band, in view of this, a method of transmitting information in an unlicensed band, a network device and a terminal are provided according to embodiments of the present disclosure.

Embodiments of the present disclosure provide a method of transmitting information in an unlicensed band, which is applied to a node. As shown in FIG. 1, the method of transmitting information includes following steps 11 to 12.

In step 11, listening to a channel of the unlicensed band with a reception beam of the node to obtain a channel listening result, when information needs to be transmitted with a transmission beam.

The node has at least one transmission beam and at least one reception beam. The embodiments of the present disclosure is especially for a scenario where the node has at least two transmission beams and/or at least two reception beams.

Furthermore, the node in the embodiments of the present disclosure may be a network device or a terminal. The network device may be a base station (Base Transceiver Station, BTS) in a global system of mobile communication (GSM) or in code division multiple access (CDMA), a base station (NodeB, NB) in wideband code division multiple access (WCDMA), an evolutional base station (Evolutional Node B, eNB, or eNodeB) in LTE, a relay station or access point, or a base station in future 5G network, which is not limited herein.

The terminal may be a wireless terminal or a wired terminal. The wireless terminal may refer to a device configured to provide voice and/or other service data connectivity to a user, a handheld device with a wireless connection function, or any other processing device connected to a wireless modem. The wireless terminal may communicate with one or more core networks via a radio access network (RAN). The wireless terminal may be a mobile terminal, such as a mobile phone (or a cellular phone) or a computer equipped with a mobile terminal. For example, the wireless terminal may be a portable, pocket-sized, handheld, computer-built-in or vehicle-mounted mobile device, which exchanges voice and/or data with a radio access network. For example, it may be a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device or a user equipment, which is not limited herein.

In step 12, transmitting the information on the channel with the transmission beam, in a case that the channel listening result indicates that the channel is in an idle state.

Furthermore, in the method of transmitting information in the unlicensed band in the embodiments of the present disclosure, a case where the transmission beam and the reception beam of the node meet beam correspondence and a case where the transmission beam and the reception beam of the node do not meet beam correspondence correspond to different listening manners. Hereinafter, the listening manner for the channel in the unlicensed band is further introduced in conjunction with whether beam correspondence is met.

In a first scenario, a first transmission beam and a first reception beam of the node meet a condition of beam correspondence.

Step 11 specifically includes: listening to the channel of the unlicensed band with the first reception beam corresponding to the first transmission beam to obtain the channel listening result, when the information needs to be transmitted with the first transmission beam.

In a case that the Tx beam and the Rx beam of the node, such as a base station, a TRP or a terminal, meet beam correspondence, the first reception beam and the first transmission beam of the node form a reception-transmission beam pair. If the first transmission beam N and the corresponding first reception beam M meet beam correspondence, it is needed to perform listening by using the first reception beam M before transmitting information on the unlicensed band by using the first transmission beam N. Specifically, listening manner for the channel of the unlicensed band in this scenario may refer to the following manners.

Manner one: the first reception beam and the first transmission beam of the node form a reception-transmission beam pair, when information needs to be transmitted through the first transmission beam, the node performs listening in a whole beam range of the first reception beam to obtain a listening result.

Specifically, in a case that the first transmission beam N and the corresponding first reception beam M meet beam correspondence, it is needed to perform listening in a whole beam range of the first reception beam M before transmitting information on the unlicensed band through the first transmission beam N. In a case that the channel listening result indicates that the channel is in an idle state, the information can be transmitted on the channel through the first transmission beam N.

Manner two: performing beamforming on the first transmission beam to obtain t transmission sub-beams; and listening to the channel of the unlicensed band with the first reception beam corresponding to the first transmission beam to obtain the channel listening result, when the information needs to be transmitted with at least one transmission sub-beam among the t transmission sub-beams. t is an integer larger than 1.

To further enhance the transmission, beamforming is performed on the first transmission beam N, the first transmission beam N is divided in its direction range to obtain multiple transmission sub-beams, i.e., narrow beams N1, N2 . . . Nt. Before transmitting information on the unlicensed band through any one or more narrow beams among the t narrow beams, it is needed to perform listening in a beam range of the first reception beam M. In a case that the channel listening result indicates that the channel is in an idle state, the information can be transmitted on the channel through the any one or more narrow beams among the t narrow beams.

Manner three: performing beamforming on the first reception beam corresponding to the first transmission beam to obtain y reception sub-beams; and listening to the channel of the unlicensed band with at least a part of the y reception sub-beams to obtain the channel listening result. y is an integer larger than 1.

To further enhance the reception, beamforming is performed on the first reception beam, the first reception beam is divided in its direction range to obtain multiple reception sub-beams, i.e., narrow beams M1, M2 . . . My. Before transmitting information on the unlicensed band through the first transmission beam N, it is needed to perform listening in a beam range of at least a part of the y narrow beams of the first reception beam M. In a case that the channel listening result indicates that the channel is in an idle state, the information can be transmitted on the channel through the first transmission beam N.

Specifically, the process of listening to the channel of the unlicensed band with the at least a part of the y reception sub-beams to obtain the channel listening result includes: listening to the channel of the unlicensed band with each reception sub-beam of the y reception sub-beams to obtain the channel listening result. That is, before transmitting information on the unlicensed band through the first transmission beam N, it is needed to perform listening in a beam range of each narrow beam of the y narrow beams of the first reception beam M, and in a case that the channel listening result indicates the channel is in an idle state, the information can be transmitted on the channel through the first transmission beam N. Specifically, the listening process includes: listening to the channel of the unlicensed band with each reception sub-beam of the y reception sub-beams; and obtaining a channel listening result which indicates that the channel is idle, in a case that it is monitored that the channel of the unlicensed band is in the idle state with at least a part of the y reception sub-beams. Specifically, LBT is performed on the unlicensed band through each narrow beam of the y narrow beams, and the channel listening result of LBT of each narrow beam indicates that the channel is idle, so the channel is determined to be in the idle state. Or, LBT is performed on the unlicensed band through each narrow beam of the y narrow beams, and the channel listening results of LBTs of a preset quantity of narrow beams indicate that the channel is idle, so the channel is determined to be in the idle state. Here, the preset quantity is an integer smaller than y.

Or, the channel of the unlicensed band is monitored with y' reception sub-beams among the y reception sub-beams to obtain the channel listening result. y' is smaller than y and y' is an integer equal to or larger than 1. That is, before transmitting information on the unlicensed band through the first transmission beam N, it is needed to perform listening in a beam range of the y' narrow beams among the y narrow beams of the first reception beam M, and in a case that the channel listening result indicates that the channel is in the idle state, the information can be transmitted on the channel through the first transmission beam N. The detailed listening process includes: listening to the channel of the unlicensed band with the y' reception sub-beams among the y reception sub-beams; and obtaining a channel listening result which indicates that the channel is idle, in a case that it is monitored that the channel of the unlicensed band is in the idle state with at least a part of the y' reception sub-beams among the y reception sub-beams. Specifically, LBT is performed on the unlicensed band through the y' narrow beams of the first reception beam M, and the channel listening result of the LBT of each narrow beam among the y' narrow beams indicates that the channel is idle, so the channel is determined to be in the idle state. Or, LBT is performed on the unlicensed band through the y' narrow beams of the first reception beam M, and the channel listening results of LBTs of a preset quantity of narrow beams among the y' narrow beams indicate that the channel is idle, so the channel is determined to be in the idle state. Here, the preset quantity is an integer smaller than y'.

In a second scenario, no transmission beam and no reception beam of the node meet the condition of beam correspondence.

Step 11 specifically includes: listening to the channel of the unlicensed band with at least a part of Y reception beams of the node to obtain the channel listening result, when the information needs to be transmitted with at least one transmission beam. The node has Y reception beams and Y is an integer larger than 1.

In a case that the Tx beam and the Rx beam of the node, such as a base station, a TRP or a terminal, do not meet beam correspondence, it is needed to perform listening in a beam range of the Y reception beams of the node before transmitting information on the unlicensed band through a transmission beam N. In a case that the channel listening result indicates that the channel is in an idle state, the information can be transmitted on the channel through the transmission beam N.

Specifically, the process of listening to the channel of the unlicensed band with the at least a part of the Y reception beams to obtain the channel listening result includes: listening to the channel of the unlicensed band with each reception beam of the Y reception beams to obtain the channel listening result. That is, before transmitting information on the unlicensed band through the transmission beam N, it is needed to perform listening in a beam range of each narrow beam of the Y reception beams, and in a case that the channel listening result indicates the channel is in an idle state, the information can be transmitted on the channel through the transmission beam N. Specifically, the listening process includes: listening to the channel of the unlicensed band with each reception beam among the Y reception beams; and obtaining a channel listening result which indicates that the channel is idle, in a case that it is monitored that the channel of the unlicensed band is in the idle state with at least a part of the Y reception beams. Specifically, LBT is performed on the unlicensed band through each of the Y reception beams, and the channel listening result of LBT of each reception beam indicates that the channel is idle, so the channel is determined to be in the idle state. Or, LBT is performed on the unlicensed band through each of the Y reception beams, and the channel listening results of LBTs of a preset quantity of reception beams indicate that the channel is idle, so the channel is determined to be in the idle state. Here, the preset quantity is an integer smaller than Y.

Or, the channel of the unlicensed band is monitored with Y' reception beams among the Y reception beams to obtain the channel listening result. Y' is smaller than Y and Y' is an integer equal to or larger than 1. That is, before transmitting information on the unlicensed band through the transmission beam N, it is needed to perform listening in a beam range of the Y' reception beams among the Y reception beams of the node, and in a case that the channel listening result indicates that the channel is in the idle state, the information can be transmitted on the channel through the transmission beam N. The detailed listening to process includes: listening to the channel of the unlicensed band with the Y' reception beams among the Y reception beams; and obtaining a channel listening result which indicates that the channel is idle, in a case that it is monitored that the channel of the unlicensed band is in the idle state with at least a part of the Y' reception beams among the Y reception beams. Specifically, LBT is performed on the unlicensed band through the Y' reception beams among the Y reception beams of the node, and the channel listening result of the LBT of each reception beam among the Y' reception beams indicates that the channel is idle, so the channel is determined to be in the idle state. Or, LBTs are performed on the unlicensed band through the Y' reception beams among the Y reception beams of the node, and the channel listening results of LBTs of a preset quantity of reception beams among the Y' reception beams indicate that the channel is idle, so the channel is determined to be in the idle state. Here, the preset quantity is an integer smaller than Y'.

It should be noted, when a data burst (Tx burst) continuously transmitted by the node on the unlicensed band includes multiple beams, each transmission beam may perform LBT according to the above-described implementation, and the node can start transmission through the transmission beam only when the LBT result indicates that the channel of the unlicensed band is idle. Furthermore, in the foregoing embodiments, the performance of the LBTs through respective reception beams may be consistent, that is, all reception beams (including complete reception beam and reception sub-beam of reception beam) use an identical LBT parameter. Optionally, the performance of the LBTs through respective reception beams may be independent, that is, different reception beams may use different LBT parameters. The LBT parameter includes at least one of: enhance Clear Channel Access slot duration (eCCA slot duration), contention window, defer period, or Energy Detection threshold (ED threshold).

In the method of transmitting information in the unlicensed band according to the embodiments of the present disclosure, when the node needs to transmit information with a transmission beam, the node monitors the channel of the unlicensed band on a corresponding reception beam to determine a state of the channel. In this way, during channel listening before the node accesses the channel, not only influence of powers of other devices on the channel but also influence of spatial characteristics of beamforming on different directions of the node are considered, to determine an accurate state of the channel, thereby ensuring success access to the channel of the node and realizing information transmission in unlicensed band.

The method of transmitting information in the unlicensed band is described in conjunction with different scenarios according to the foregoing embodiments. The corresponding node is further described in conjunction with drawings hereinafter.

Figure 2:
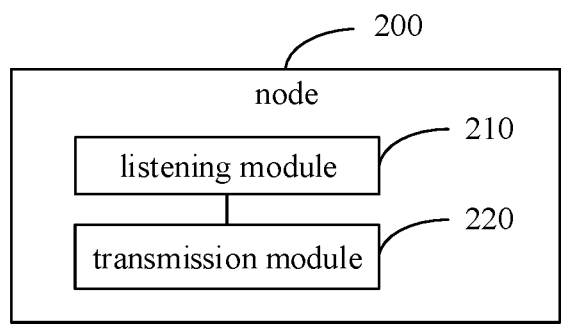
FIG. 2 is a schematic structural diagram of modules of a node according to embodiments of the present disclosure.

As shown in FIG. 2, a node 200 in embodiments of the present disclosure can achieve details of the method of transmitting information according to the foregoing embodiments and achieve the same effect; in the method of transmitting information, when information needs to be transmitted with a transmission beam, the channel of the unlicensed band is monitored with a reception beam of the node to obtain a channel listening result, and in a case that the channel listening result indicates that the channel is idle, the information is transmitted on the channel with the transmission beam. The node 200 includes a listening module 210 and a transmission module 220.

The listening module 210 is configured to listen to a channel of an unlicensed band with a reception beam of the node to obtain a channel listening result, when information needs to be transmitted with a transmission beam.

The transmission module 220 is configured to transmit the information on the channel with the transmission beam, in a case that the channel listening result indicates that the channel is in an idle state.

Optionally, the listening module 210 includes a first listening sub-module, configured to: in a case that a first transmission beam and a first reception beam of the node meet a condition of beam correspondence, listen to the channel of the unlicensed band with the first reception beam corresponding to the first transmission beam to obtain the channel listening result when the information needs to be transmitted with the first transmission beam.

Optionally, the first listening sub-module includes a first forming unit, configured to perform beamforming on the first transmission beam to obtain t transmission sub-beams, where t is an integer larger than 1; and a first listening unit, configured to listen to the channel of the unlicensed band with the first reception beam corresponding to the first transmission beam to obtain the channel listening result, when the information needs to be transmitted with at least one transmission sub-beam among the t transmission sub-beams.

Optionally, the first listening sub-module includes a second forming unit, configured to perform beamforming on the first reception beam corresponding to the first transmission beam to obtain y reception sub-beams, where y is an integer larger than 1; and a second listening unit, configured to listen to the channel of the unlicensed band with at least a part of the y reception sub-beams to obtain the channel listening result.

Optionally, the second listening unit includes a first listening sub-unit, configured to listen to the channel of the unlicensed band with each reception sub-beam of the y reception sub-beams to obtain the channel listening result; or a second listening sub-unit, configured to listen to the channel of the unlicensed band with y' reception sub-beams among the y reception sub-beams to obtain the channel listening result, where y' is smaller than y and y' is an integer equal to or larger than 1.

Optionally, the first listening sub-unit is configured to: listen to the channel of the unlicensed band with each reception sub-beam of the y reception sub-beams; and obtain a channel listening result which indicates that the channel is idle, in a case that it is monitored that the channel of the unlicensed band is in the idle state with at least a part of the y reception sub-beams.

Optionally, the second listening sub-unit is configured to: listen to the channel of the unlicensed band with the y' reception sub-beams among the y reception sub-beams; and obtain a channel listening result which indicates that the channel is idle, in a case that it is monitored that the channel of the unlicensed band is in the idle state with at least a part of the y' reception sub-beams among the y reception sub-beams.

Optionally, the listening module 210 further includes a second listening sub-module, configured to: in a case that all transmission beams and all reception beams of the node do not meet a condition of beam correspondence, listen to the channel of the unlicensed band with at least a part of Y reception beams of the node to obtain the channel listening result when the information needs to be transmitted with at least one transmission beam, where the node has Y reception beams and Y is an integer larger than 1.

Optionally, the second listening sub-module includes a third listening unit, configured to listen to the channel of the unlicensed band with each reception beam of the Y reception beams to obtain the channel listening result; or a fourth listening unit, configured to listen to the channel of the unlicensed band with Y' reception beams among the Y reception beams to obtain the channel listening result, where Y' is smaller than Y and Y' is an integer equal to or larger than 1.

Optionally, the third listening unit includes a third listening sub-unit, configured to listen to the channel of the unlicensed band with each reception beam of the Y reception beams; and a first processing sub-unit, configured to obtain a channel listening result which indicates that the channel is idle, in a case that it is monitored that the channel of the unlicensed band is in the idle state with at least a part of the Y reception beams.

Optionally, the fourth listening unit includes a fourth listening sub-unit, configured to listen to the channel of the unlicensed band with the Y' reception beams among the Y reception beams; and a second processing sub-unit, configured to obtain a channel listening result which indicates that the channel is idle, in a case that it is monitored that the channel of the unlicensed band is in the idle state with at least a part of the Y' reception beams among the Y reception beams.

Optionally, the node includes a terminal or a network device.

It should be noted, it is understandable that the division of respective modules of the node is merely a division based on logic functions. In implementation, the modules may be all or partially integrated into one physical body, or may be separated physically. The modules may all be embodied in the form of software calling through processing elements or in the form of hardware, or, part of the modules may be embodied into in the form of software calling through processing elements and part of the module may be embodied in the form of hardware. For example, the determining module may be an independent processing unit, or may be integrated into a certain chip of the device, or may be stored in the memory of the device in form of program codes and may be called by a certain processing unit of the device to implement the function of the determining module. Implementations of other modules are similar. Furthermore, the modules may be all or partially integrated together, or may be independent from each other. The processing unit herein may be an integrated circuit having signal processing ability. In implementation, respective steps of the method or respective modules can be achieved with hardware integrated logic circuits in the processing unit or in way of software.

For example, the modules may be configured to be one or more integrated circuits for implementing the method, such as one or more Application Specific Integrated Circuits (ASICs), or one or more Digital Signal Processors (DSPs), or one or more Field Programmable Gate Arrays (FPGAs) and so on. Further for example, in a case that a certain module is implemented in way of calling program codes by a processing element, the processing element may be a general processor such as a central processing unit CPU) or other processor capable of calling program codes. Further for example, the modules may be integrated together in form of system-on-a-chip (SOC).

It should be noted, based on the node according to the embodiments of the present disclosure, when information needs to be transmitted with a transmission beam, the channel of the unlicensed band is monitored on a corresponding reception beam to determine a state of the channel. In this way, when the node accesses the channel and performs channel listening, not only influence of powers of other devices on the channel but also influence of spatial characteristics of beamforming on different directions of the node are considered, to determine an accurate state of the channel, thereby ensuring success access to the channel of the node and realizing information transmission in unlicensed band.

For better realizing the above objective, a network device is further provided according to embodiments of the present disclosure. The network device includes a processor, a memory and a computer program which is stored on the memory and executable by the processor. The processor, when executing the computer program, implements steps of the above-described method of transmitting information in the unlicensed band. A computer readable storage medium is further provided according to embodiments of the present disclosure. A computer program is stored on the computer readable storage medium, and the computer program, when being executed by a processor, implements steps of the above-described method of transmitting information in the unlicensed band.

Figure 3:
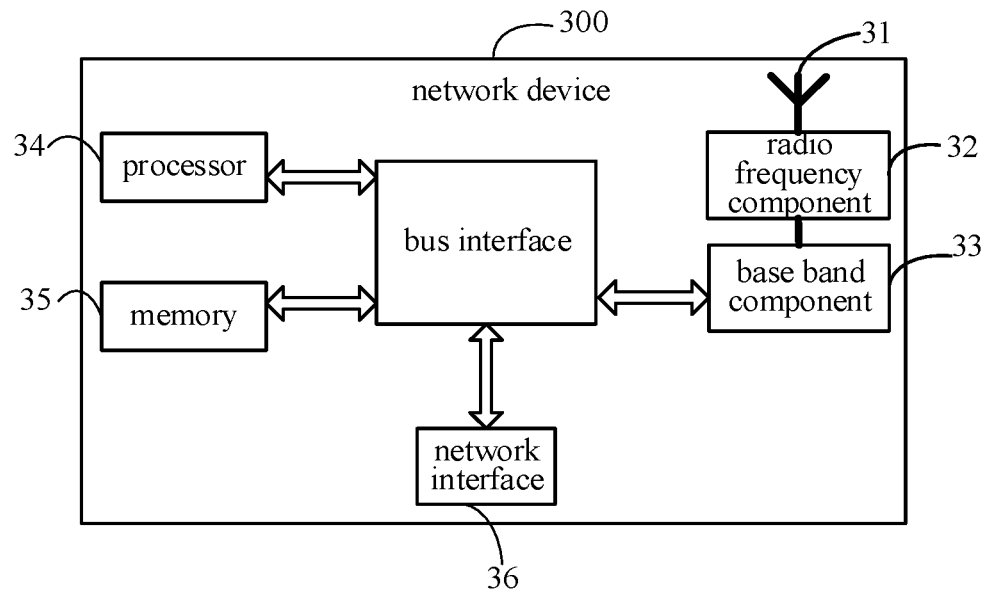
FIG. 3 is a block diagram of a network device according to embodiments of the present disclosure.

Specifically, a network device is further provided according to embodiments of the present disclosure. As shown in FIG. 3, the network device 300 includes: an antenna 31, a radio frequency component 32 and a base band component 33. The antenna 31 is connected with the radio frequency component 32. In uplink direction, the radio frequency component 32 receives information via the antenna 31 and sends the received information to the base band component 33 for processing. In downlink direction, the base band component 33 processes information to be transmitted and sends the processed information to the radio frequency component 32, and the radio frequency component 32 processes the received information and then transmits the information via the antenna 31.

The above-described frequency band processing component may be located within the base band component 33. The method executed by the network device in foregoing embodiments may be implemented in the base band component 33. The base band component 33 includes a processor 34 and a memory 35.

The base band component 33, for example, may include at least one base band plate which is provided with multiple chips. As shown in FIG. 3, one chip such as the processor 34 is connected to the memory 35, to call a program in the memory 35 and implement processes of the network device according to the foregoing embodiments.

The base band component 33 may further include a network interface 36 which is configured to exchange information with the radio frequency component 32. The interface is, for example, a common public radio interface (CPRI).

Herein, the processor may be one processor, or may be multiple processing units. For example, the processor may be a CPU, or an ASIC, or one or more integrated circuits configured to implement the method executed by the network device, such as one or more DSPs, or one or more FPGAs. The storage unit may be one memory or may be multiple storage units.

The memory 35 may be may be a volatile memory or a non-volatile memory, or may include both volatile and non-volatile memories. The non-volatile memory may be a read-only memory (ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) and a direct rambus random access memory (Direct Rambus RAM, DRRAM). The memory 35 described in the present disclosure is intended to include, without being limited to, these and any other suitable types of memories.

Specifically, the network device according to the embodiments of the present disclosure further includes a computer program which is stored on the memory 35 and executable by the processor 34, and the processor 34 calls the computer program stored in the memory 35 to implement the method executed by respective modules as shown in FIG. 2.

Specifically, the computer program, when being called by the processor 34, may implement: listening to a channel of the unlicensed band with a reception beam of the node to obtain a channel listening result, when information needs to be transmitted with a transmission beam; and transmitting the information on the channel with the transmission beam, in a case that the channel listening result indicates that the channel is in an idle state.

Specifically, in a case that a first transmission beam and a first reception beam of the node meet a condition of beam correspondence, the computer program, when being called by the processor 34, may implement: listening to the channel of the unlicensed band with the first reception beam corresponding to the first transmission beam to obtain the channel listening result, when the information needs to be transmitted with the first transmission beam.

Specifically, the computer program, when being called by the processor 34, may implement: performing beamforming on the first transmission beam to obtain t transmission sub-beams, where t is an integer larger than 1; and listening to the channel of the unlicensed band with the first reception beam corresponding to the first transmission beam to obtain the channel listening result, when the information needs to be transmitted with at least one transmission sub-beam among the t transmission sub-beams.

Specifically, the computer program, when being called by the processor 34, may implement: performing beamforming on the first reception beam corresponding to the first transmission beam to obtain y reception sub-beams, where y is an integer larger than 1; and listening to the channel of the unlicensed band with at least a part of the y reception sub-beams to obtain the channel listening result.

Specifically, the computer program, when being called by the processor 34, may implement: listening to the channel of the unlicensed band with each reception sub-beam of the y reception sub-beams to obtain the channel listening result; or listening to the channel of the unlicensed band with y' reception sub-beams among the y reception sub-beams to obtain the channel listening result, where y' is smaller than y and y' is an integer equal to or larger than 1.

Specifically, the computer program, when being called by the processor 34, may implement: listening to the channel of the unlicensed band with each reception sub-beam of the y reception sub-beams; and obtaining a channel listening result which indicates that the channel is idle, in a case that it is monitored that the channel of the unlicensed band is in the idle state with at least a part of the y reception sub-beams.

Specifically, the computer program, when being called by the processor 34, may implement: listening to the channel of the unlicensed band with the y' reception sub-beams among the y reception sub-beams; and obtaining a channel listening result which indicates that the channel is idle, in a case that it is monitored that the channel of the unlicensed band is in the idle state with at least a part of the y' reception sub-beams among the y reception sub-beams.

Specifically, when all transmission beams and all reception beams of the node do not meet beam correspondence, the computer program, when being called by the processor 34, may implement: listening to the channel of the unlicensed band with at least a part of Y reception beams of the node to obtain the channel listening result, when the information needs to be transmitted with at least one transmission beam, where the node has Y reception beams and Y is an integer larger than 1.

Specifically, the computer program, when being called by the processor 34, may implement: listening to the channel of the unlicensed band with each reception beam of the Y reception beams to obtain the channel listening result; or listening to the channel of the unlicensed band with Y' reception beams among the Y reception beams to obtain the channel listening result, where Y' is smaller than Y and Y' is an integer equal to or larger than 1.

Specifically, the computer program, when being called by the processor 34, may implement: listening to the channel of the unlicensed band with each reception beam among the Y reception beams; and obtaining a channel listening result which indicates that the channel is idle, in a case that it is monitored that the channel of the unlicensed band is in the idle state with at least a part of the Y reception beams.

Specifically, the computer program, when being called by the processor 34, may implement: listening to the channel of the unlicensed band with the Y' reception beams among the Y reception beams; and obtaining a channel listening result which indicates that the channel is idle, in a case that it is monitored that the channel of the unlicensed band is in the idle state with at least a part of the Y' reception beams among the Y reception beams.

With the network device according to the embodiments of the present disclosure, when information needs to be transmitted with a transmission beam, the channel of the unlicensed band is monitored on a corresponding reception beam to determine a state of the channel. In this way, when the network device accesses the channel and performs channel listening, not only influence of powers of other devices on the channel but also influence of spatial characteristics of beamforming on different directions of the network device are considered, to determine an accurate state of the channel, thereby ensuring success access to the channel of the node and realizing information transmission in unlicensed band.

For better realizing the above objective, a terminal is further provided according to embodiments of the present disclosure. The terminal includes a processor, a memory and a computer program which is stored on the memory and executable by the processor. The processor, when executing the computer program, implement steps of the above-described method of transmitting information in the unlicensed band. A computer readable storage medium is further provided according to embodiments of the present disclosure. A computer program is stored on the computer readable storage medium, and the computer program, when being executed by a processor, implement steps of the above-described method of transmitting information in the unlicensed band.

Figure 4:
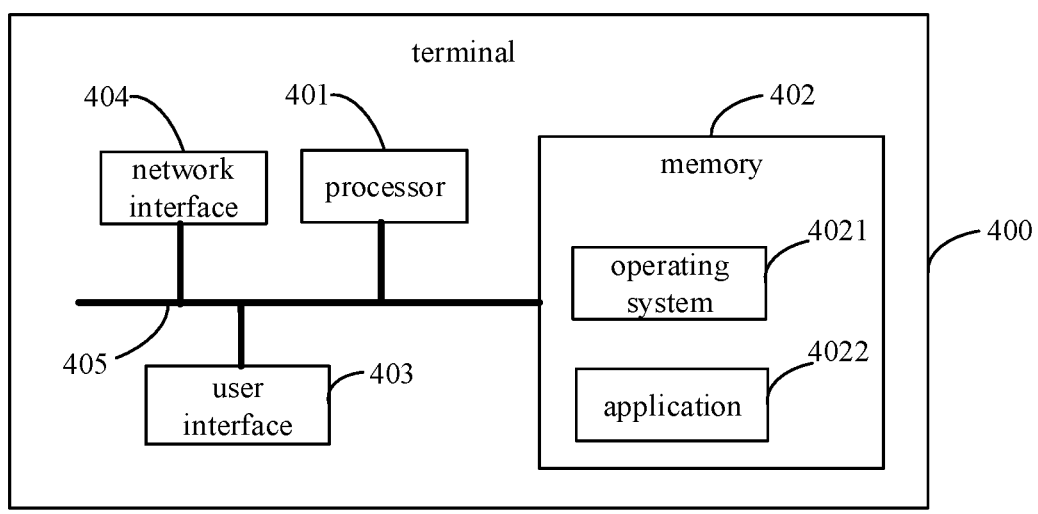
FIG. 4 is a block diagram of a terminal according to embodiments of the present disclosure.

Specifically, FIG. 4 is a block diagram of a terminal 400 according to embodiments of the present disclosure. The terminal shown in FIG. 4 includes: at least one processor 401, a memory 402, a user interface 403 and a network interface 404. Various components of the terminal 400 may be coupled together via a bus system 405. It is understandable, the bus system 405 is configured to implement connection and communication among the components. In addition to data bus, the bus system 405 includes a power bus, a control bus and a state signal bus. For clarity, various buses are labeled as the bus system 405 in FIG. 4.

The user interface 403 may include a display or a click device such as a touch board or a touch screen.

It is understandable, the memory 402 in the embodiments of the present disclosure may be a volatile memory or a non-volatile memory, or may include both volatile and non-volatile memories. The non-volatile memory may be a read-only memory (ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) and a direct rambus random access memory (Direct Rambus RAM, DRRAM). The memory 402 in the systems and methods described in the present disclosure is intended to include, without being limited to, these and any other suitable types of memories.

In some implementations, the memory 402 stores the following elements, executable modules or data structures, or a subset thereof, or an extended set thereof: an operating system 4021; and an application 4022.

The operating system 4021 includes various system programs such as a framework layer, a core library layer and a driving layer, for implementing various fundamental services and processing hardware-based tasks. The application 4022 includes various applications such as media player and browser, for implementing various application services. A program for implementing the method according to the embodiments of the present disclosure may be included in the application 4022.

In the embodiments of the present disclosure, the terminal 400 further includes a computer program which is stored on the memory 402 and executable by the processor 401. Specifically, the computer program may be the computer program in the application 4022. The computer program, when being executed by the processor 401, may implement the following steps: listening to a channel of the unlicensed band with a reception beam of the node to obtain a channel listening result, when information needs to be transmitted with a transmission beam; and transmitting the information on the channel with the transmission beam, in a case that the channel listening result indicates that the channel is in an idle state.

The methods according to the foregoing embodiments of the present disclosure may be applied to the processor 401, or implemented by the processor 401. The processor 401 may be an integrated circuit chip with signal processing capabilities. In implementation, each step of the foregoing methods may be completed by an integrated logic circuit in form of hardware in the processor 401 or instructions in form of software. The processor 401 above may be a general-purpose processor, a digital signal processor (DSP), an application specific integrated circuit (ASIC), a field programmable gate array (FPGA) or any other programmable logic device, a discrete gate, a transistor logic device or a discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module may be located in a conventional well-developed storage medium such as a random access memory, a flash memory, a read-only memory, a programmable read-only memory, an electrically erasable programmable memory, a register, or the like. The storage medium is located in the memory 402, and the processor 401 reads the information in the memory 402 and completes the steps of the above methods in combination with its hardware.

It can be understood that the embodiments described herein may be implemented in hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (Programmable Logic Device, PLD), field-programmable gate arrays (FPGA), general purpose processors, controllers, microcontrollers, microprocessors, other electronics units for performing the functions according to the present disclosure or a combination thereof.

For software implementation, the technical solutions according to the present disclosure may be implemented by modules (e.g., processes, functions, and so on) for performing the functions according to the present disclosure. Software codes may be stored in a memory and executed by a processor. The memory may be implemented in the processor or external to the processor.

Specifically, in a case that a first transmission beam and a first reception beam of the node meet beam correspondence, the computer program, when being executed by the processor 401, may further implement: listening to the channel of the unlicensed band with the first reception beam corresponding to the first transmission beam to obtain the channel listening result, when the information needs to be transmitted with the first transmission beam.

Specifically, the computer program, when being executed by the processor 401, may implement: performing beamforming on the first transmission beam to obtain t transmission sub-beams, where t is an integer larger than 1; and listening to the channel of the unlicensed band with the first reception beam corresponding to the first transmission beam to obtain the channel listening result, when the information needs to be transmitted with at least one transmission sub-beam among the t transmission sub-beams.

Specifically, the computer program, when being executed by the processor 401, may implement: performing beamforming on the first reception beam corresponding to the first transmission beam to obtain y reception sub-beams, where y is an integer larger than 1; and listening to the channel of the unlicensed band with at least a part of the y reception sub-beams to obtain the channel listening result.

Specifically, the computer program, when being executed by the processor 401, may implement: listening to the channel of the unlicensed band with each reception sub-beam of the y reception sub-beams to obtain the channel listening result; or listening to the channel of the unlicensed band with y' reception sub-beams among the y reception sub-beams to obtain the channel listening result, where y' is smaller than y and y' is an integer equal to or larger than 1.

Specifically, the computer program, when being executed by the processor 401, may implement: listening to the channel of the unlicensed band with each reception sub-beam of the y reception sub-beams; and obtaining a channel listening result which indicates that the channel is idle, in a case that it is monitored that the channel of the unlicensed band is in the idle state with at least a part of the y reception sub-beams.

Specifically, the computer program, when being executed by the processor 401, may implement: listening to the channel of the unlicensed band with the y' reception sub-beams among the y reception sub-beams; and obtaining a channel listening result which indicates that the channel is idle, in a case that it is monitored that the channel of the unlicensed band is in the idle state with at least a part of the y' reception sub-beams among the y reception sub-beams.

Specifically, when no transmission beam and no reception beam of the node meet beam correspondence, the computer program, when being executed by the processor 401, may implement: listening to the channel of the unlicensed band with at least a part of Y reception beams of the node to obtain the channel listening result, when the information needs to be transmitted with at least one transmission beam, where the node has Y reception beams and Y is an integer larger than 1.

Specifically, the computer program, when being executed by the processor 401, may implement: listening to the channel of the unlicensed band with each reception beam of the Y reception beams to obtain the channel listening result; or listening to the channel of the unlicensed band with Y' reception beams among the Y reception beams to obtain the channel listening result, where Y' is smaller than Y and Y' is an integer equal to or larger than 1.

Specifically, the computer program, when being executed by the processor 401, may implement: listening to the channel of the unlicensed band with each reception beam among the Y reception beams; and obtaining a channel listening result which indicates that the channel is idle, in a case that it is monitored that the channel of the unlicensed band is in the idle state with at least a part of the Y reception beams.

Specifically, the computer program, when being executed by the processor 401, may implement: listening to the channel of the unlicensed band with the Y' reception beams among the Y reception beams; and obtaining a channel listening result which indicates that the channel is idle, in a case that it is monitored that the channel of the unlicensed band is in the idle state with at least a part of the Y' reception beams among the Y reception beams.

With the terminal according to the embodiments of the present disclosure, when information needs to be transmitted with a transmission beam, the channel of the unlicensed band is monitored on a corresponding reception beam to determine a state of the channel. In this way, when the terminal accesses the channel and performs channel listening, not only influence of powers of other devices on the channel but also influence of spatial characteristics of beamforming on different directions of the terminal are considered, to determine an accurate state of the channel, thereby ensuring success access to the channel of the node and realizing information transmission in unlicensed band.

Those skilled in the art will appreciate that the units or the algorithm steps described in conjunction with the embodiments according to the present disclosure may be implemented in the form of electronic hardware or a combination of computer software and electronic hardware. Whether these functions are performed in hardware or software depends on the specific application and design constraints of the solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the devices and the units described above, and a repeated description thereof is omitted herein.

It should be understood that in the embodiments according to the present disclosure, the disclosed method and device may be implemented in other ways. For example, the described embodiments directed to the device are merely exemplary. For example, the units are divided merely in logical function, which may be divided in another way in actual implementation, e.g., multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments of the present disclosure.

In addition, functional units in various embodiments of the present disclosure may be integrated into one processing unit, or may be physically independent, or two or more units may be integrated into one unit.

If the functions are implemented in the form of a software functional unit, and sold or used as a standalone product, the unit may be stored in a computer readable storage medium. Based on this understanding, essence of the technical solution of the present disclosure, or the part contributing to the related technologies, or part of the technical solution, can be embodied in the form of a software product. The computer software product is stored in a storage media, and the computer software product includes a number of instructions to enable a computer device (which may be a personal computer, a server, or a network device, etc.) to perform all or part of the steps of the method described in the various embodiments of the present disclosure. The storage medium includes a USB flash disk, a mobile hard disk, a read-only memory (ROM), a random access memory (RAM), a magnetic disk, an optical disk, and other medium which can store program code.

In addition, it should be noted that, various components of the device or various steps of the method in the present disclosure may be divided and/or re-combined. Such dividing and/or recombining are equivalents of the present disclosure. The steps for performing the above series of processing may be performed according to the described order in chronological order; however, it is not necessary to perform the steps in the chronological order, and some steps may be performed concurrently or independently. It is understandable by those ordinary skilled in the art that, all or any of the steps or components of the method or device of the present disclosure can be implemented with hardware, firmware, software or a combination thereof in any computing device (including processor, storage medium, and so on) or a network of computing devices, which can be realized by those ordinary skilled in the art with basic programming skills after reading the present disclosure.

Hence, the object of the present disclosure can be realized by running a program or a group of programs on any computing device. The computing device may be a well-known general-purpose device. The object of the present disclosure can be realized by merely providing a program product including the program codes for implementing the method or device. That is, the present disclosure can also be embodied into such program product or a storage medium storing such program product. Apparently, the storage medium may be any known storage medium or any storage medium to be developed in the future. It should be further noted that, various components of the device or various steps of the method in the present disclosure may be divided and/or re-combined. Such dividing and/or recombining are equivalents of the present disclosure. The steps for performing the above series of processing may be performed according to the described order in chronological order however, it is not necessary to perform the steps in the chronological order, and some steps may be performed concurrently or independently.

Optional embodiments are described hereinabove. It should be noted that various improvements and polishments can be made by those ordinary skilled in the art without departing from the principle of the present disclosure. The improvements and polishments fall within the protection scope of the present disclosure.

What is claimed is:

1. A method of transmitting information in an unlicensed band, applied to a node, comprising:
listening to a channel of the unlicensed band with a reception beam of the node to obtain a channel listening result, when information needs to be transmitted with a transmission beam; and
transmitting the information on the channel with the transmission beam, in a case that the channel listening result indicates that the channel is in an idle state; wherein:
in a case that a first transmission beam and a first reception beam of the node meet a condition of beam correspondence, the step of, listening to the channel of the unlicensed band with the reception beam of the node to obtain the channel listening result, when the information needs to be transmitted with the transmission beam, comprises: listening to the channel of the unlicensed band with the first reception beam corresponding to the first transmission beam to obtain the channel listening result, when the information needs to be transmitted with the first transmission beam; or,
in a case that no transmission beam and no reception beam of the node meet a condition of beam correspondence, the step of, listening to the channel of the unlicensed band with the reception beam of the node to obtain the channel listening result, when the information needs to be transmitted with the transmission beam, comprises: listening to the channel of the unlicensed band with at least a part of Y reception beams of the node to obtain the channel listening result, when the information needs to be transmitted with at least one transmission beam, wherein the node has Y reception beams and Y is an integer larger than 1.

2. The method of transmitting information in the unlicensed band according to claim 1, wherein the step of, listening to the channel of the unlicensed band with the first reception beam corresponding to the first transmission beam to obtain the channel listening result, when the information needs to be transmitted with the first transmission beam, comprises:
performing beamforming on the first transmission beam to obtain t transmission sub-beams, where t is an integer larger than 1; and
listening to the channel of the unlicensed band with the first reception beam corresponding to the first transmission beam to obtain the channel listening result, when the information needs to be transmitted with at least one transmission sub-beam among the t transmission sub-beams.

3. The method of transmitting information in the unlicensed band according to claim 1, wherein the step of listening to the channel of the unlicensed band with the first reception beam corresponding to the first transmission beam to obtain the channel listening result comprises:
performing beamforming on the first reception beam corresponding to the first transmission beam to obtain y reception sub-beams, where y is an integer larger than 1; and
listening to the channel of the unlicensed band with at least a part of the y reception sub-beams to obtain the channel listening result.

4. The method of transmitting information in the unlicensed band according to claim 3, wherein the step of listening to the channel of the unlicensed band with the at least a part of the y reception sub-beams to obtain the channel listening result comprises:
listening to the channel of the unlicensed band with each reception sub-beam of the y reception sub-beams to obtain the channel listening result; or listening to the channel of the unlicensed band with y' reception sub-beams among the y reception sub-beams to obtain the channel listening result, where y' is smaller than y and y' is an integer equal to or larger than 1.

5. The method of transmitting information in the unlicensed band according to claim 4, wherein,
the step of listening to the channel of the unlicensed band with each reception sub-beam of the y reception sub-beams to obtain the channel listening result comprises:
listening to the channel of the unlicensed band with each reception sub-beam of the y reception sub-beams; and
obtaining a channel listening result which indicates that the channel is idle, in a case that it is monitored that the channel of the unlicensed band is in the idle state with at least a part of the y reception sub-beams.

6. The method of transmitting information in the unlicensed band according to claim 4, wherein the step of listening to the channel of the unlicensed band with the y' reception sub-beams among the y reception sub-beams to obtain the channel listening result comprises:
listening to the channel of the unlicensed band with the y' reception sub-beams among the y reception sub-beams; and
obtaining a channel listening result which indicates that the channel is idle, in a case that it is monitored that the channel of the unlicensed band is in the idle state with at least a part of the y' reception sub-beams among the y reception sub-beams.

7. The method of transmitting information in the unlicensed band according to claim 1, wherein the step of listening to the channel of the unlicensed band with the at least a part of the Y reception beams of the node to obtain the channel listening result comprises:
listening to the channel of the unlicensed band with each reception beam of the Y reception beams to obtain the channel listening result; or
listening to the channel of the unlicensed band with Y' reception beams among the Y reception beams to obtain the channel listening result, where Y' is smaller than Y and Y' is an integer equal to or larger than 1.

8. The method of transmitting information in the unlicensed band according to claim 7, wherein the step of listening to the channel of the unlicensed band with the Y' reception beams among the Y reception beams to obtain the channel listening result comprises:
listening to the channel of the unlicensed band with the Y' reception beams among the Y reception beams; and
obtaining a channel listening result which indicates that the channel is idle, in a case that it is monitored that the channel of the unlicensed band is in the idle state with at least a part of the Y' reception beams among the Y reception beams.

9. The method of transmitting information in the unlicensed band according to claim 7, wherein,
the step of listening to the channel of the unlicensed band with each reception beam of the Y reception beams to obtain the channel listening result comprises:
listening to the channel of the unlicensed band with each reception beam among the Y reception beams; and
obtaining a channel listening result which indicates that the channel is idle, in a case that it is monitored that the channel of the unlicensed band is in the idle state with at least a part of the Y reception beams.

10. The method of transmitting information in the unlicensed band according to claim 1, wherein the node comprises a terminal or a network device.

11. A node, comprising a processor, a memory and a program stored in the memory and executable by the processor, wherein, when the program is executed by the processor, the following steps are performed:
listening to a channel of an unlicensed band with a reception beam of the node to obtain a channel listening result, when information needs to be transmitted with a transmission beam; and
transmitting the information on the channel with the transmission beam, in a case that the channel listening result indicates that the channel is in an idle state; wherein:
the processor is configured to: in a case that a first transmission beam and a first reception beam of the node meet a condition of beam correspondence, listen to the channel of the unlicensed band with the first reception beam corresponding to the first transmission beam to obtain the channel listening result when the information needs to be transmitted with the first transmission beam; or,
the processor is configured to: in a case that no transmission beam and no reception beam of the node meet a condition of beam correspondence, listen to the channel of the unlicensed band with at least a part of Y reception beams of the node to obtain the channel listening result when the information needs to be transmitted with at least one transmission beam, wherein the node has Y reception beams and Y is an integer larger than 1.

12. The node according to claim 11, wherein the processor is configured to:
perform beamforming on the first transmission beam to obtain t transmission sub-beams, where t is an integer larger than 1; and
listen to the channel of the unlicensed band with the first reception beam corresponding to the first transmission beam to obtain the channel listening result, when the information needs to be transmitted with at least one transmission sub-beam among the t transmission sub-beams.

13. The node according to claim 11, wherein the processor is configured to:
perform beamforming on the first reception beam corresponding to the first transmission beam to obtain y reception sub-beams, where y is an integer larger than 1; and
listen to the channel of the unlicensed band with at least a part of the y reception sub-beams to obtain the channel listening result.

14. The node according to claim 13, wherein the processor is configured to:
listen to the channel of the unlicensed band with each reception sub-beam of the y reception sub-beams to obtain the channel listening result; or
listen to the channel of the unlicensed band with y' reception sub-beams among the y reception sub-beams to obtain the channel listening result, where y' is smaller than y and y' is an integer equal to or larger than 1.

15. The node according to claim 14, wherein, the processor is configured to:
listen to the channel of the unlicensed band with each reception sub-beam of the y reception sub-beams; and
obtain a channel listening result which indicates that the channel is idle, in a case that it is monitored that the channel of the unlicensed band is in the idle state with at least a part of the y reception sub-beams.

16. The node according to claim 14, wherein the processor is configured to:
  listen to the channel of the unlicensed band with the y' reception sub-beams among the y reception sub-beams; and
  obtain a channel listening result which indicates that the channel is idle, in a case that it is monitored that the channel of the unlicensed band is in the idle state with at least a part of the y' reception sub-beams among the y reception sub-beams.

17. The node according to claim 11, wherein the processor is configured to:
  listen to the channel of the unlicensed band with each reception beam of the Y reception beams to obtain the channel listening result; or
  listen to the channel of the unlicensed band with Y' reception beams among the Y reception beams to obtain the channel listening result, where Y' is smaller than Y and Y' is an integer equal to or larger than 1.

18. The node according to claim 17, wherein the processor is configured to:
  listen to the channel of the unlicensed band with the Y' reception beams among the Y reception beams; and
  obtain a channel listening result which indicates that the channel is idle, in a case that it is monitored that the channel of the unlicensed band is in the idle state with at least a part of the Y' reception beams among the Y reception beams.

19. The node according to claim 17, wherein, the processor is configured to:
  listen to the channel of the unlicensed band with each reception beam of the Y reception beams; and
  obtain a channel listening result which indicates that the channel is idle, in a case that it is monitored that the channel of the unlicensed band is in the idle state with at least a part of the Y reception beams.

20. The node according to claim 11, wherein the node comprises a terminal or a network device.

* * * * *